United States Patent [19]

Ozawa

[11] Patent Number: 4,856,489
[45] Date of Patent: Aug. 15, 1989

[54] IGNITION TIMING CONTROL APPARATUS FOR AN INTERNAL COMBUSTION ENGINE

[75] Inventor: Masayuki Ozawa, Himeji, Japan

[73] Assignee: Mitsubishi Denki Kabushiki Kaisha, Tokyo, Japan

[21] Appl. No.: 203,995

[22] Filed: Jun. 8, 1988

[30] Foreign Application Priority Data

Jun. 8, 1987 [JP] Japan ................... 62-142702
Jun. 8, 1987 [JP] Japan ................... 62-142703
Jun. 8, 1987 [JP] Japan ................... 62-142704

[51] Int. Cl.$^4$ ............................................ F02P 5/04
[52] U.S. Cl. .................................. 123/643; 123/613
[58] Field of Search ............................ 123/643, 613

[56] References Cited

U.S. PATENT DOCUMENTS

| | | | |
|---|---|---|---|
| 4,442,822 | 4/1984 | Kondo et al. | 123/613 |
| 4,508,092 | 4/1985 | Kiess et al. | 123/613 |
| 4,527,522 | 6/1985 | Cerny | 123/643 |
| 4,742,811 | 5/1988 | Okada et al. | 123/643 |
| 4,747,389 | 5/1988 | Yuzawa et al. | 123/643 |
| 4,757,798 | 7/1988 | Sasaki | 123/643 |
| 4,765,306 | 8/1988 | Scarnera et al. | 123/643 |

FOREIGN PATENT DOCUMENTS 226232  1/1984  Japan ................... 123/643

Primary Examiner—Raymond A. Nelli
Attorney, Agent, or Firm—Oblon, Spivak, McClelland, Maier & Neustadt

[57] ABSTRACT

An ignition timing control apparatus for an internal combustion engine comprises a signal rotor rotating in synchronism with the revolution of the engine, a plurality of trigger poles attached on the outer circumference of the signal rotor at positions corresponding to an ignition timing for each of the cyclinders, a signal coil for generating an angle signal in correspondence to the position of the trigger poles and an ignition timing operating device which measures the periods in the angle signal and compares the periods by multiplying a given coefficient alternately to thereby discriminate the cylinders and operate ignition timing for the cylinders.

3 Claims, 15 Drawing Sheets

IGNITION TIMING CONTROL APPARATUS FOR AN INTERNAL COMBUSTION ENGINE

BACKGROUND OF THE INVENTION

1. FIELD OF THE INVENTION

The present invention relates to an ignition timing control apparatus for a non-distribution type internal combustion engine in which ignition of the cylinders is effected without using a distributer.

2. DISCUSSION OF BACKGROUND

As an example of an ignition timing control apparatus of this kind, FIG. 13 shows a control apparatus for a four-cycle engine. In FIG. 13, a reference numeral 1 designates a signal generating means which has the construction as shown in FIG. 14. A reference numeral 2 designates a signal rotor rotating in synchronism with the revolution of the internal combustion engine. A trigger pole 3 is attached on the outer circumference of the signal rotor 2. A pair of signal coils 4a, 4b are provided at phase angle positions of 180° with respect to the signal rotor 2 and facing the trigger pole 3. The output terminals of the signal coils 4a, 4b are respectively connected to waveform shaping circuits 5a, 5b which are, in turn, connected to an ignition timing operating device 6. Reference numerals 7a, 7b respectively designate amplifying circuits for amplifying the outputs of the ignition timing operating device, which are respectively connected to the primary coils of the ignition coils 8a, 8b. The output terminals of the secondary coil of the ignition coil 8a are respectively connected to the ignition plug 9a for the first cylinder and the ignition plug 9b for the fourth cylinder. The output terminals of the secondary coil of the ignition coil 8b are respectively connected to the ignition plug 9c for the second cylinder and the ignition plug 9d for the third cylinder.

The operation of the ignition control apparatus having the above-mentioned construction will be described with reference to a timing chart as in FIG. 15 in which reference characters a–h respectively designate signals generated at the positions a–h in the apparatus and the device shown in FIGS. 13 and 14.

When the signal rotor 2 is rotated in the arrow mark direction in synchronism with the revolution of the engine, an angle signal including positive and negative pulses is generated from the signal coil 4a as shown in FIG. 15a, and an angle signal including positive and negative pulses is generated from the signal coil 4b as shown in FIG. 15b. The later angle signal has a phase lag of 180° with respect to the former. These angle signals are respectively subjected to waveform-shaping in the waveform shaping circuits 5a, 5b and are outputted in a form of rectangular signals as shown in FIG. 15c and 15d. The ignition timing operating device 6 performs predetermined operations for ignition timing on the basis of the rectangular signals, whereby ignition timing control signals as shown in FIGS. 15e and 15f are outputted. The ignition timing control signals are respectively amplified in the amplifying circuits 7a and 7b to be used to continue and break the electric conduction to the ignition coils 8a, 8b. The waveform of currents supplied to the primary coils of the ignition coils 8a, 8b are respectively shown in FIGS. 15g and 15h. A high voltage is produced at the secondary coils when the currents are interrupted, whereby spark discharging is respectively resulted at each group of ignition plugs 9a, 9b and 9c, 9d so that the corresponding cylinders are ignited at predetermined periods of ignition timing. In the embodiment as shown in FIGS. 13 through 15, the spark discharging takes place for the groups of the first and the fourth cylinders and the second and third cylinders simultaneously. In this case, when one group of cylinders is in an explosion process, the other group is in a discharging process. Accordingly, the spark discharging for the cylinders in the discharging process does not contribute to ignition.

FIG. 16 shows an example of a signal generating means for a 90°V-type two cycle engine. The structure of an ignition timing control apparatus including the signal generating means is the same as that shown in FIG. 13 provided that it has no ignition plugs 9c and 9d.

As shown in FIG. 16, a single trigger pole 3 is attached on the signal rotor 2, and the signal coils 4a, 4b are provided to have a phase difference of 90° with respect to the signal rotor 2 and facing the trigger pole 3, whereby there produces a signal having a leg of 90° from the signal coil 4b with respect to a signal from the signal coil 4a. The ignition timing control apparatus produces signals having the waveforms as shown in FIG. 17a through 17h, whereby spark discharging is effected for the ignition plugs 9a, 9b.

FIG. 18 shows a signal generating means for a 75°V-type two cycle engine. An ignition timing control apparatus including the signal generating means is the same as that shown in FIG. 13 provided that it has no ignition plugs 9c and 9d.

As shown in FIG. 18, a single trigger pole 3 is attached on the signal rotor 2, and signal coils 4a, 4b are provided at positions to have a phase difference of 75° on the signal rotor 2 and facing the trigger pole 3. The ignition timing control apparatus produces signals. The waveforms of these signals are the same as shown in FIG. 17 except that the phase of angle signals is different.

In the conventional ignition timing control apparatus having the above-mentioned construction, a space is required for the coils corresponding to the number of cylinders. This opposes requirement for reducing the size an internal combustion engine. Further, the manufacturing cost of the engine is increased by providing the signal coils in correspondence to the number of cylinders.

There is another proposal as disclosed in Japanese Examined Pat. Publication No. 1350/1984 or Japanese Examined Patent Publication No. 49427/1984 that a number of trigger poles are attached on the outer circumference of a signal rotor at equal distances so that ignition timing control signals are distributed to the ignition coils by a signal generated from a signal coil. However, the proposed apparatus required an additional signal coil to detect a reference position of the signal rotor. Further, the construction of the ignition timing operating device was complicated. In addition, since operations for estimation of ignition timing were conducted by an angle signal by using a trigger pole 3 or trigger poles 3, the ignition timing became incorrect due to change in revolution of a V-type engine.

SUMMARY OF THE INVENTION

It is an object of the present invention to provide an ignition timing control apparatus for an internal combustion engine capable of reducing the size of the apparatus and reducing the manufacturing cost by using a single signal coil.

In accordance with the present invention, there is provided an ignition timing control apparatus for an internal combustion engine which comprises:

a signal rotor rotating in synchronism with the revolution of the engine, a plurality of trigger poles attached on the outer circumference of the signal rotor at positions corresponding to an ignition timing for each of the cylinders, a guide pole disposed in front of a specified trigger pole among the trigger poles, a signal coil for generating an angle signal in correspondence to the angle between the specified trigger pole and the guide pole, and an ignition timing operating device which measures the periods between the guide pole and the trigger poles on the basis of the angle signal, and compares one of the periods with the other by multiplying a given coefficient alternately to thereby discriminate said cylinders and operate ignition timing for said cylinders.

In an aspect of the present invention, there is provided an ignition timing control apparatus for a non-uniform arrangement type internal combustion engine wherein ignition timing angle signals for igniting a plurality of the cylinders are irregularly generated when a signal rotor is rotated in synchronism with the engine, characterized by comprising a plurality of trigger poles arranged on the outer circumference of the signal rotor at a position which is in ignition-advance-angle-controllable range of each cylinder in said engine, a signal coil located facing the trigger poles to generate an angle signal corresponding to the each angular position of said trigger poles, and an ignition timing operating device which measures the periods between the trigger poles on the basis of the angle signal and compares the periods to thereby discriminate said cylinders and operate ignition timing for the cylinders.

Further, in another aspect of the present invention, there is provided an ignition timing control apparatus for a non-uniform arrangement type internal combustion engine wherein ignition timing angle signals for igniting a plurality of the cylinders are irregularly generated when a signal rotor is rotated in synchronism with the engine, characterized by comprising a plurality of trigger poles arranged on the outer circumference of the signal rotor so as to correspond to cylinders in the engine, a signal coil located facing the trigger poles to generate an angle signal corresponding to the each angular position of the trigger poles, and an ignition timing operating device which performs operations of ignition timing on the basis of the angle signal and which measures each period corresponding to the angular position of each of the trigger poles, and compares the interval between the advance angle side and the initial side of a trigger pole with the interval between the initial side of the trigger pole and the advance angle side of the next trigger pole, to thereby discriminate the cylinders and to output an ignition timing control signal for the cylinders.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In the following, several preferred embodiments of the ignition timing control apparatus according to the present invention will be described with reference to the drawings.

Figure 1:
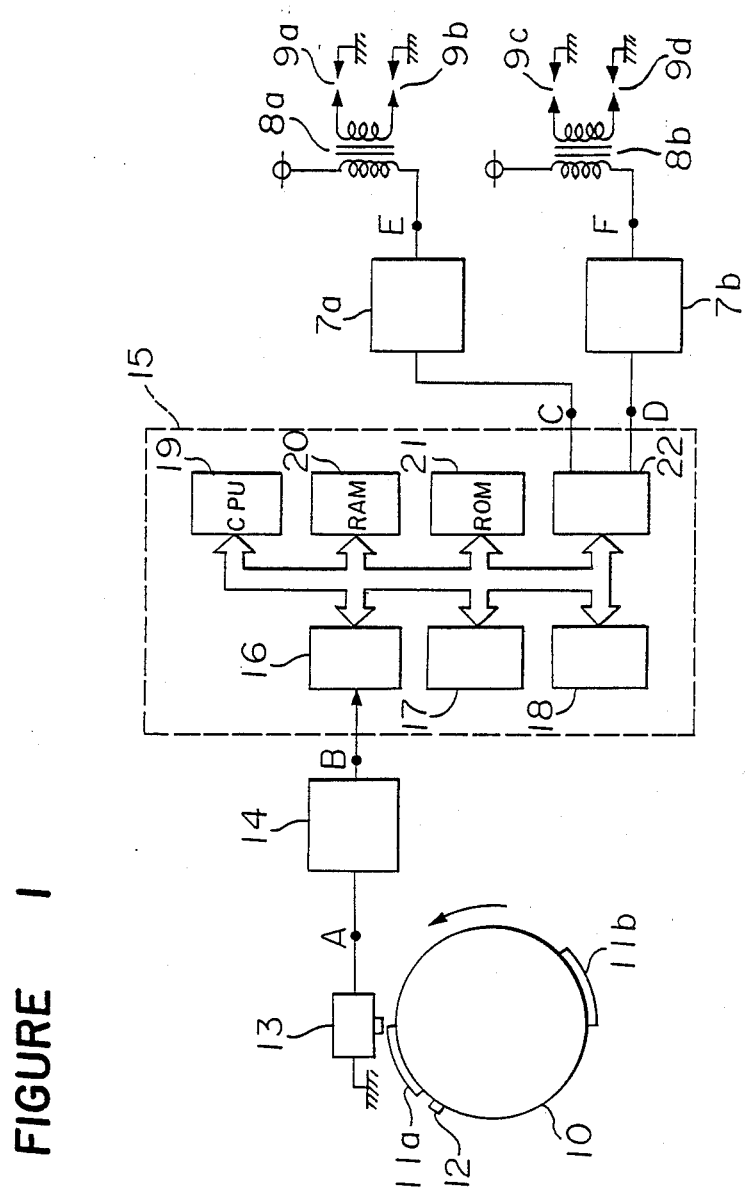
FIG. 1 is a diagram of a first embodiment of the ignition timing control apparatus for an internal combustion engine according to the present invention.
Figure 2:
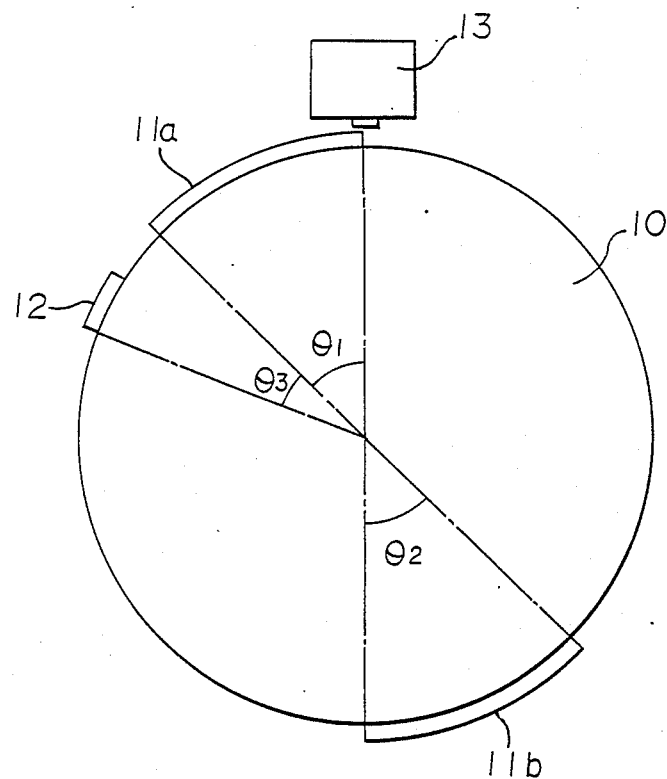
FIG. 2 is a diagram showing the construction of a signal generating means in FIG. 1.

FIG. 1 is a diagram showing a first embodiment of the ignition timing control apparatus for an internal combustion engine of the present invention. In FIG. 1, a reference numeral 10 designates a signal rotor. On the outer circumference of the signal rotor 10, two trigger poles 11a, 12b corresponding to two cylinders are provided at an angular distance of 180° as shown in FIG. 2. Each of the trigger poles 11a, 11b occupies a surface area corresponding to an angle of 45° ($\theta_1$ or $\theta_2$). A guide pole 12 for discriminating the cylinders of the engine is disposed in front of the trigger pole 11a with respect to the direction of rotation of the signal rotor 10. The position of the guide pole 12 is so determined that the distance between the front end of the guide pole 12 and the front end of the trigger pole 11a with respect to the direction of revolution of the signal rotor has an angle of 22.5° ($\theta_3$). A signal coil 13 is provided so as to come close to the trigger poles 11a, 11b and the guide pole 12 when the signal rotor 10 is rotated. An output from the signal coil 13 is inputted to a microcomputer 15 as an ignition timing operating device through a waveform shaping circuit 14.

The microcomputer 15 comprises an input port 16, an input timer 17, an output timer 18, a CPU 19, an RAM 20, an ROM 21, and an output port 22. The output terminal of the waveform shaping circuit 14 is connected to the input port 16, and the output port 22 is connected respectively to amplifying circuits 7a, 7b. Reference numerals 8a, 8b designate ignition coils, and numerals 9a through 9d designate ignition plugs.

Figure 3:
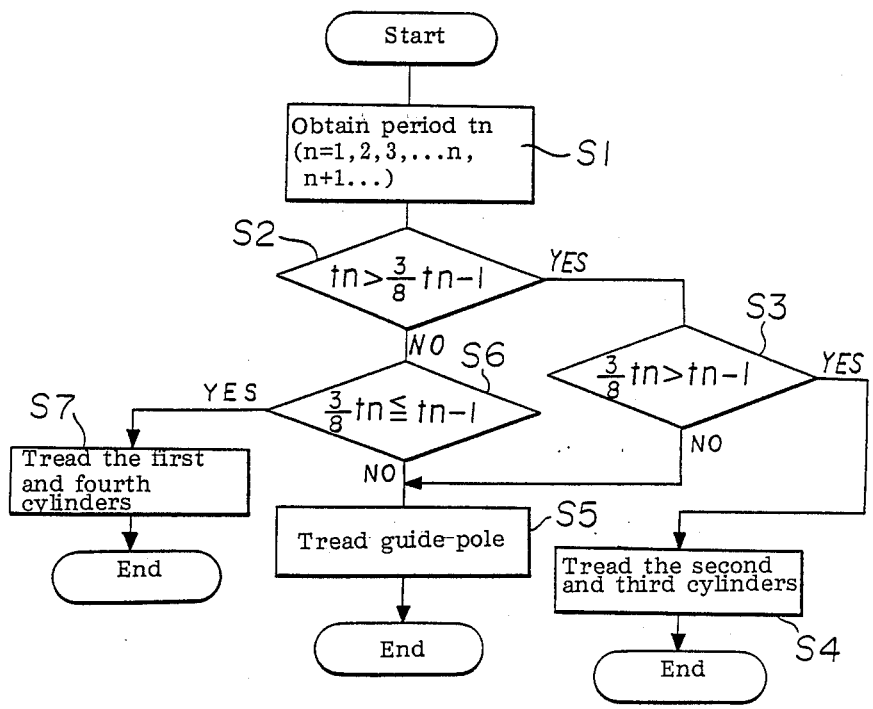
FIG. 3 is a flow chart showing an embodiment of the sequential operations for discriminating cylinders in an internal combustion engine according to the first embodiment of the present invention.
Figure 4:
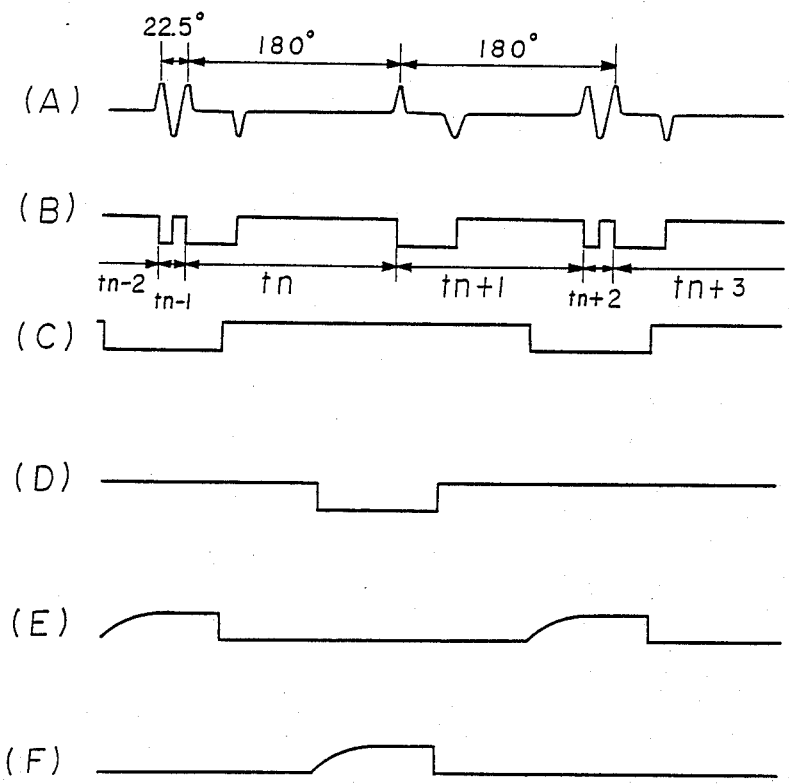
FIGS. 4A through 4F shows the waveforms of signals produced in the ignition timing control apparatus according to the first embodiment of the present invention.

The operation of the ignition timing control apparatus having the above-mentioned construction will be described with reference to a flow chart in FIG. 3 and a timing chart in FIG. 4.

When the signal rotor 10 is rotated in synchronism with the revolution of the engine, an angle signal including positive and negative pulses corresponding to the guide pole 12 and the trigger poles 11a, 11b is generated from the signal coil 13 as shown in FIG. 4A.

The waveforms as shown in FIGS. 4A-4F respectively designate the waveforms of signals produced at the point of A-F in FIG. 1. The angle signal generated from the signal coil 13 is inputted in the waveform shaping circuit 14 to be subjected to waveform-shaping as shown in FIG. 4B, and then, the waveform-shaped signal is inputted to the microcomputer 15.

The period $t_n (n=1,2,3,\ldots n,n+1,\ldots)$ of the signal is obtained at Step S1 in the microcomputer 15. At Step S2, a value $t_n$ is compared with a value $t_{n-1}$ multiplied by $\frac{3}{8}$. When $t_n > \frac{3}{8} t_{n-1}$, then Step S3 is taken at which a value of $t_n$ multiplied by $\frac{3}{8}$ is compared with a value of $t_{n-1}$ at Step S6. When $\frac{3}{8} t_n \leq t_{n-1}$, a treatment for the first and the fourth cylinders is carried out at Step S7. On the contrary, when $\frac{3}{8} t_n > t_{n-1}$ a treatment for the guide pole is carried out at Step S5. In the treatment of the first and the fourth cylinders, the microcomputer 15 generates an ignition timing control signal for the cylinders as shown in FIG. 4C.

When $t_n$ is smaller than $\frac{3}{8} t_{n-1}$ at Step S2, then, determination is made as to whether or not $\frac{3}{8} t_n$ is smaller than $t_{n-1}$ at Step S6. When $\frac{3}{8} t_n \leq t_{n-1}$, *a treatment for the first and the fourth cylinders is carried out at Step S7. On the contrary, when $\frac{3}{8} t_n > t_{n-1}$ a treatment for the guide pole is carried out at Step S5. In the treatment of the first and the fourth cylinders, the microcomputer 15 generates an ignition timing control signal for the cylinders as shown in FIG. 4C.

The ignition signal for the first and the fourth cylinders (FIG. 4C) and the ignition timing control signal for the second and the third cylinders (FIG. 4D) are respectively supplied from the microcomputer 15 through the amplifying circuits 7a, 7b to the ignition coils 8a, 8b. The ignition coils 8a, 8b are respectively actuated by signals as shown in FIGS. 4E, 4F by which a high voltage is produced in the secondary coils when the currents are interrupted to thereby produce spark discharging at the ignition plugs 9a-9d.

In the above-mentioned embodiment, the guide pole 12 is disposed at the position advanced by 22.5° to the trigger pole 11a, and the period $t_n$ is multiplied by a coefficient of $\frac{3}{8}$ in the discriminating treatment of cylinders in the microcomputer 15. However, use of these values is not critical, and the guide pole 12 may be disposed at another position and another coefficient may be used to discriminate the cylinders. Thus, in the above-mentioned first embodiment of the present invention, a signal is distributed to a plurality of cylinders by means of a single signal coil by providing a guide pole in front of a trigger pole among the trigger poles corresponding to the cylinders and by suitably treating periods in an angle from the signal coil. Accordingly, the overall size of the ignition timing control apparatus is reduced as well as the manufacturing cost.

Figure 5:
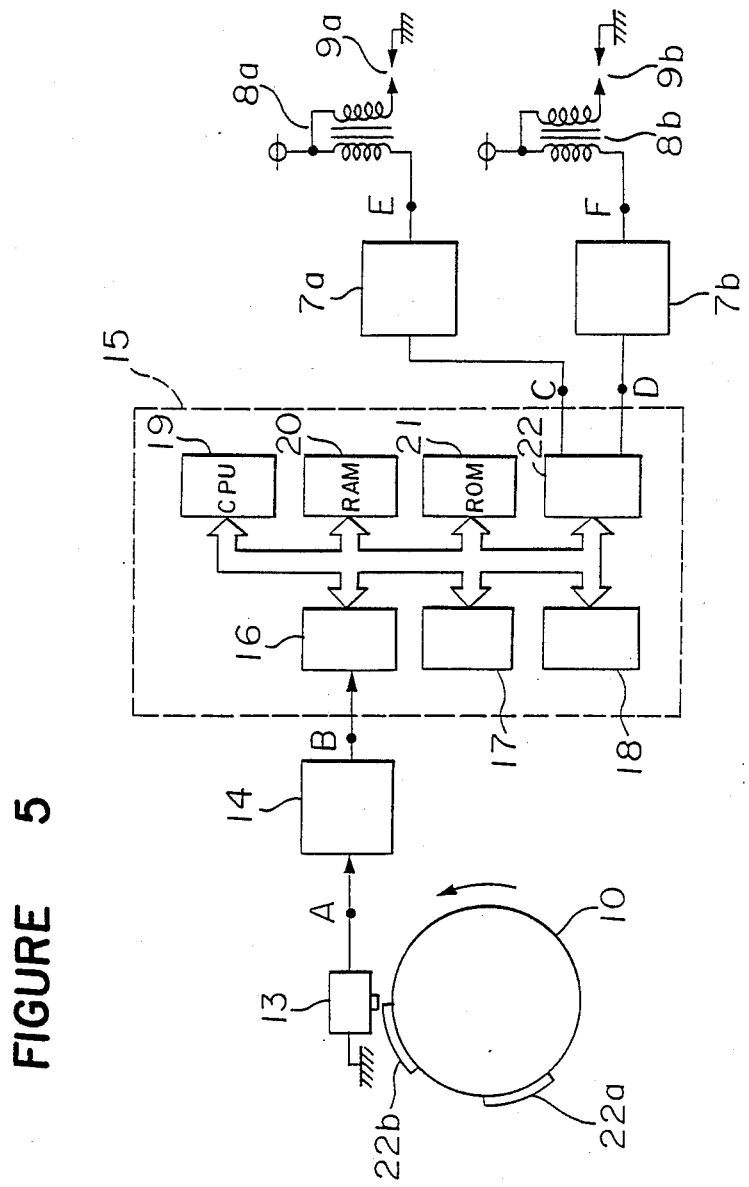
FIG. 5 is a diagram of a second embodiment of the ignition timing control apparatus for an internal combustion engine according to the present invention.
Figure 6:
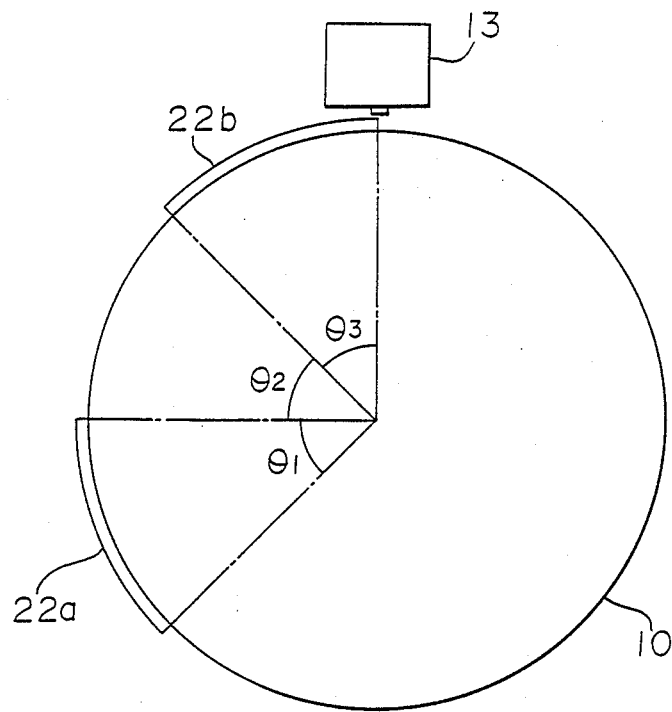
FIG. 6 is a diagram showing an embodiment of the signal generating means for the control apparatus in FIG. 5.

FIG. 5 is a diagram of a second embodiment of the ignition timing control apparatus of the present invention. In FIG. 5, the same reference numerals designate the same or corresponding parts. The signal rotor is provided with at its outer circumference trigger poles 22a, 22b which correspond to two cylinders of a 90°V-type two cycle engine (FIG. 6). Each of the trigger poles is provided on the outer circumference of the signal rotor in the areas which respectively correspond to angles $\theta_1$ and $\theta_3$. When the angle formed between the trigger poles 22a, 22b is $\theta_2$, a relation among $\theta_1$, $\theta_2$ and $\theta_3$ is $\theta_1 + \theta_2 = \theta_2 + \theta_3 = 90° \theta_1 = \theta_3 = \theta_2$. A signal coil 13 is provided in the vicinity of the signal rotor 10 so that it comes close to the trigger poles 22a, 22b when the signal rotor 10 is rotated. An output produced in the signal coil 13 is supplied to a microcomputer 15 (which is an ignition timing operating device) through a waveform shaping circuit 14. The microcomputer 15 has the same construction as that shown in FIG. 1. The output terminal of the waveform shaping circuit 14 is connected to the input port 16, and the output port 22 is respectively connected to amplifying circuits 7a, , 7b.

Figure 7:
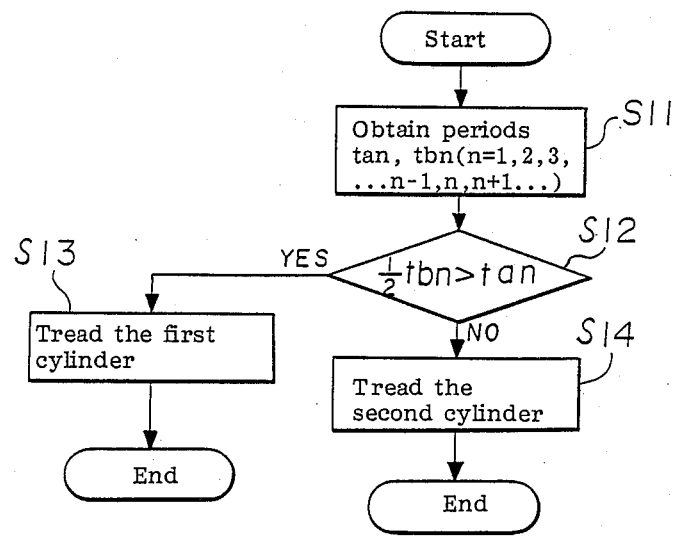
FIG. 7 is a flow chart showing sequential operations for discriminating cylinders in the internal combustion engine.
Figure 8:
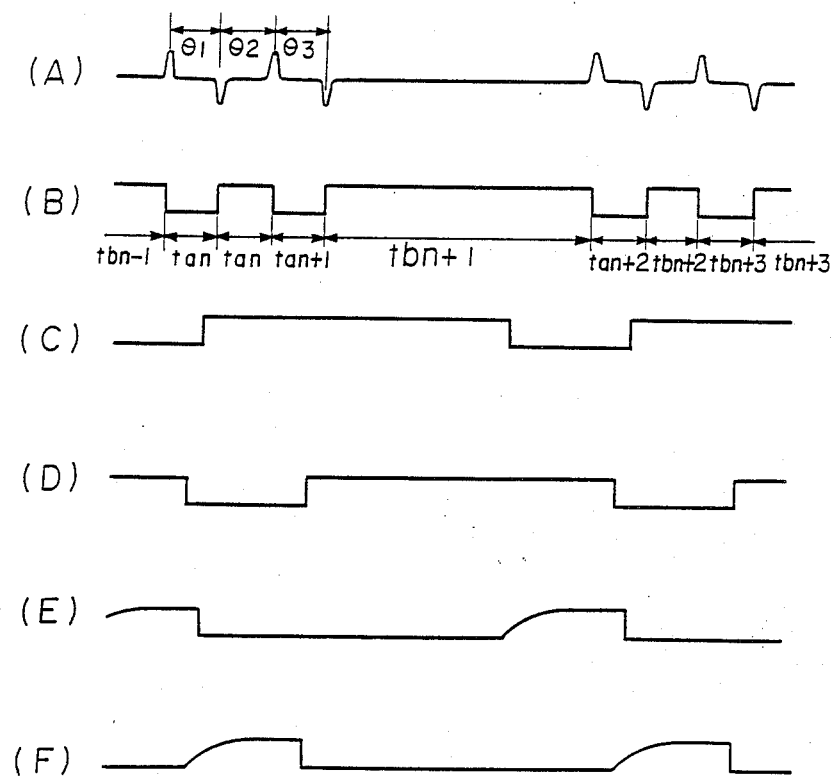
FIGS. 8A through 8F shows the waveforms of signals produced in the ignition timing control apparatus according to the second embodiment of the present invention.

The operation of the ignition timing control apparatus having the above-mentioned construction will be described with reference to a flow chart in FIG. 7 and a timing chart in FIG. 8.

When the signal rotor is rotated in synchronism with the revolution of the engine, an angle signal including positive and negative pulses as shown in FIG. 8A is generated in the signal coil 13. FIGS. 8A-8F respectively show the waveforms of signals produced at the points of A-F in the apparatus shown in FIG. 5. The angle signal from the signal coil 13 is waveform-shaped by the waveform shaping circuit 14 (FIG. 8B) and it is inputted into the microcomputer 15.

The microcomputer 15 operates as follows. At Step S11, the periods $t_{an}$, $t_{bn}(n=1,2,3,\ldots n-1, n, n+1, \ldots)$ of the signal are obtained. At Step S12, a value $t_{bn}$ multiplied by $\frac{1}{2}$ is compared with a value $t_{an}$. Namely, the distance of signal from the advance angle side to the initial side of the first trigger pole 22a is compared with the distance of signal from the initial side of the trigger pole 22a to the advance angle side of the next trigger pole 22b, in a frequency of the two trigger poles 22a, 22b.

At Step S12, when $\frac{1}{2} t_{bn} > t_{an}$, then, Step S13 is taken where operation of ignition timing for the first cylinder is carried out. As a result of the operation of ignition timing, an ignition timing control signal (FIG. 8C) is generated from the microcomputer 15 to be supplied to the ignition coil 8a, through the amplifying circuit 7a, , whereby the ignition coil 8a, is actuated in accordance with a signal as shown in FIG. 8E.

When $\frac{1}{8} t_{bn} > t_{an}$ at Step S12, operation of ignition timing for the second cylinder is carried out at Step S14. The output signal produced by the operation of ignition timing is supplied to the ignition coil 8b through the amplifying circuit 7b (FIG. 8D), and the ignition coil 8b is actuated by a signal as shown in FIG. 8F. A high voltage is produced in the secondary coil when a current supplied to the secondary coil is interrupted, and spark discharging is resulted in the ignition plug 9b.

In the description of the second embodiment, a 90°V-type two cycle engine is used as a non-distribution engine in which the trigger poles 22a, 22b are provided on the signal rotor 10 in a non-uniform fashion is used. However, the same effect can be obtained by using a non-uniform arrangement type engine having cylinders of the number more than two. The trigger poles 22a, 22b may be placed on the signal rotor 10 so as to have a relation in the angle of $\theta_1 = \theta_2 = \theta_3$. However, another relation of angle may be used as far as the value $t_{an}$ can be compared with the value $t_{bn}$.

Thus, in accordance with the second embodiment of the present invention, a signal can be distributed to a plurality of cylinders by means of a single signal coil, whereby the overall size of the control apparatus can be reduced as well as the manufacturing cost.

Figure 9:
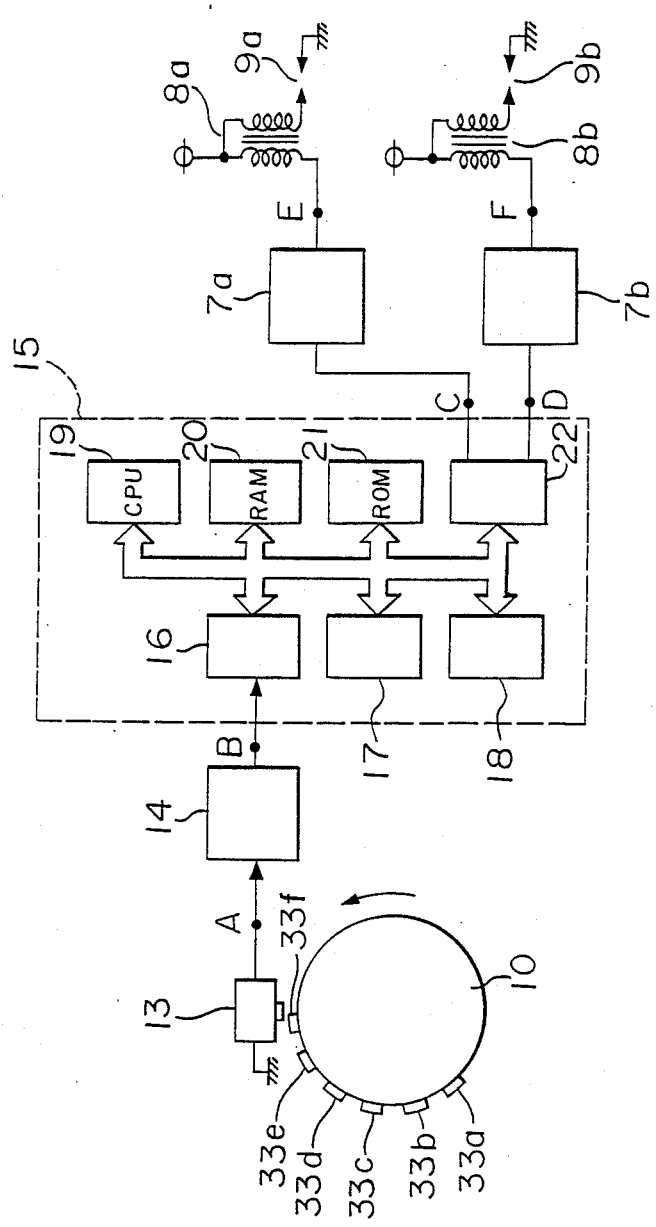
FIG. 9 is a diagram of a third embodiment of the ignition timing control apparatus for an internal combustion engine according to the present invention.
Figure 10:
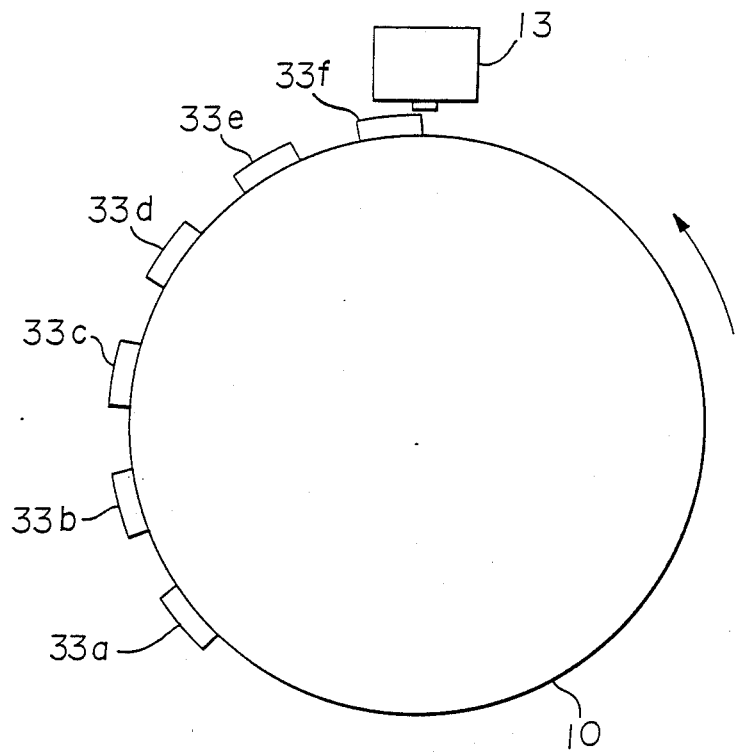
FIG. 10 is a diagram of an embodiment of a signal generating means used for the third embodiment of the present invention.

FIG. 9 is a diagram of a third embodiment of the ignition timing control apparatus according to the present invention. In FIG. 9, a reference numeral 10 designates a signal rotor. Six trigger poles 33a–33f are attached on the outer circumference of the signal rotor 10 as shown in FIG. 10. In this embodiment, the signal rotor with the six trigger poles is used for a 75°V-type two cycle engine, and the distance between the front edge of the trigger pole 33a and the front edge of the trigger pole 33d, i.e. the distance between the advance angle side of the first cylinder and the advance angle side of the second cylinder is determined to be at an angle of 75°. A signal coil 13 is provided in the vicinity of the signal rotor 10 so as to come close to the trigger poles 13a–13f when the signal rotor 10 is rotated. The output of the signal coil is supplied to a microcomputer 15 (which is an ignition timing operating device) through a waveform shaping circuit 14.

The microcomputer 15 comprises an input port 16, an input timer 17 an output timer 18, a PCU 19, an RAM 20, an ROM 21 and an output port 22. The output terminal of the waveform shaping circuit 14 is connected to the input port 16, and the output port 22 is respectively connected to amplifying circuits 7a, , 7b. Reference numerals 8a, , 8b designate ignition coils and numerals 9a, 9b designate ignition plugs.

Figure 11:
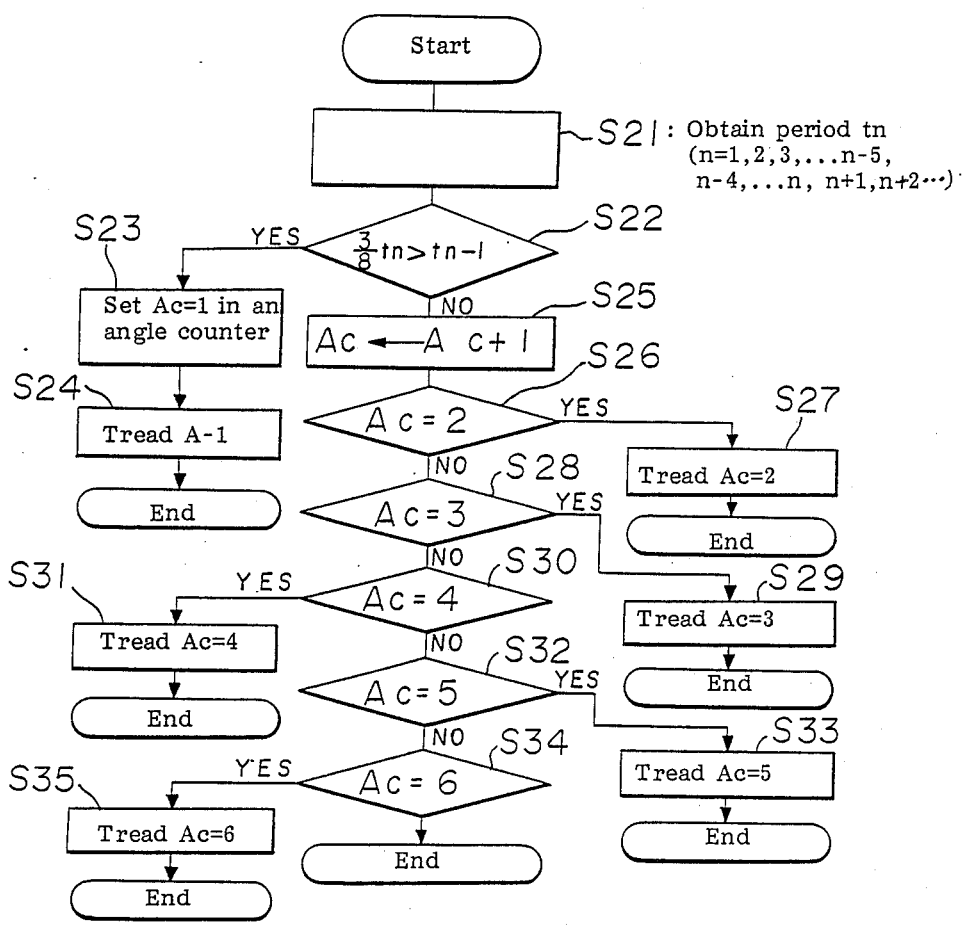
FIG. 11 is a flow chart showing sequential operations for discriminating cylinders in the internal combustion engine according to the second embodiment of the present invention.
Figure 12:
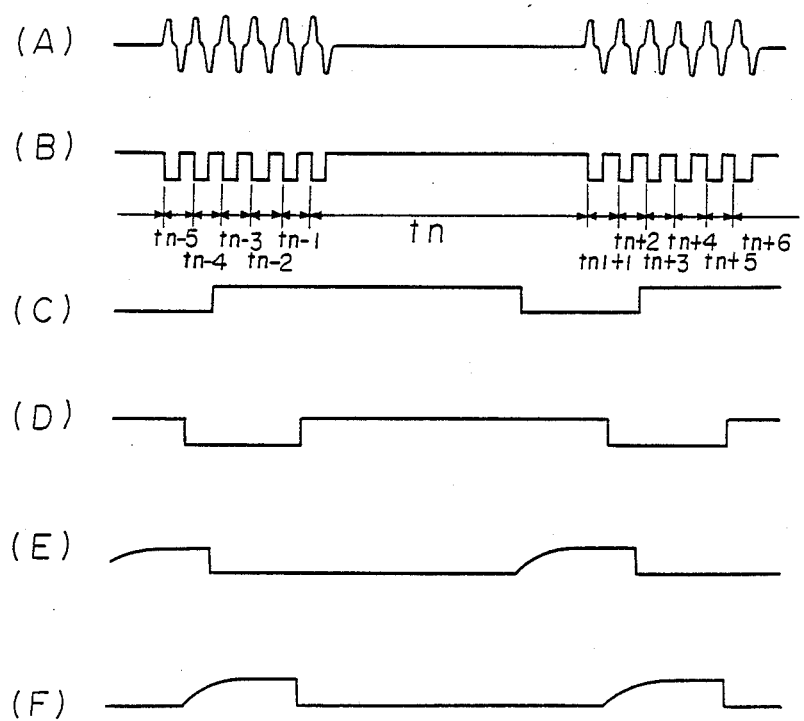
FIGS. 12A through 12F shows the waveforms of signals produced in the ignition timing control apparatus of the third embodiment of the present invention.
Figure 13:
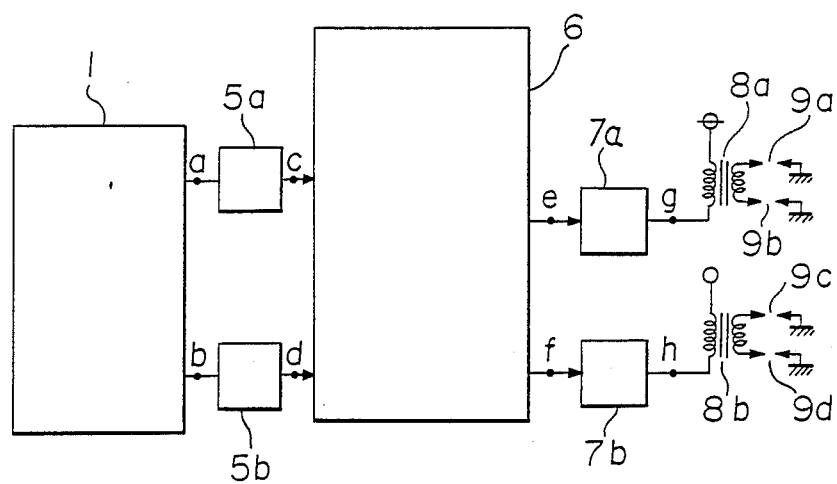
FIG. 13 is a diagram showing a conventional ignition timing control apparatus for an internal combustion engine.
Figure 14:
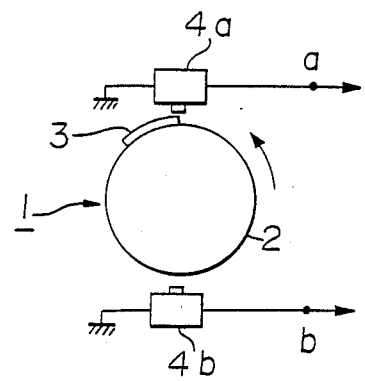
FIG. 14 is a diagram showing a signal generating means used for the conventional ignition timing control apparatus.
Figure 15:
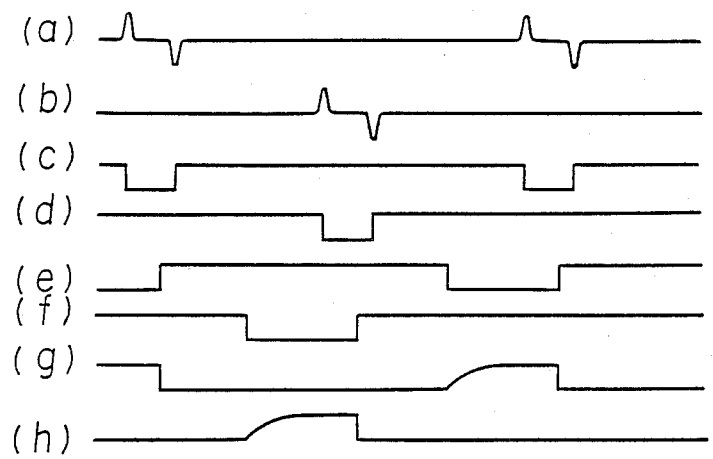
FIGS. 15A through 15F shows the waveforms of signals produced in the conventional ignition timing control apparatus.
Figure 16:
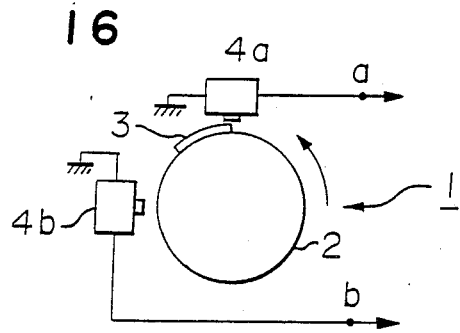
FIG. 16 is a diagram showing another conventional signal generating means.
Figure 17:
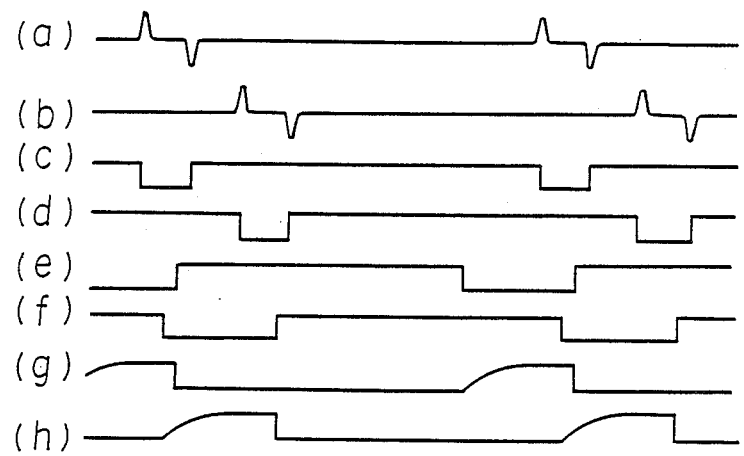
FIGS. 17A through 17H show the waveform of signals produced in an ignition timing control apparatus in which the signal generating means shown in FIG. 16 is used.
Figure 18:
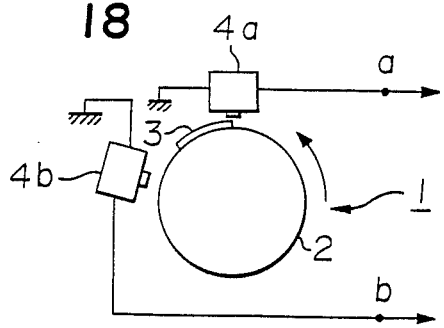
FIG. 18 is a diagram showing another conventional signal generating means.

The operation of the ignition timing control apparatus having the above-mentioned construction will be described with reference to a flow chart in FIG. 11 and a timing chart in FIG. 12.

When the signal rotor 10 is rotated in synchronism with the revolution of the engine, an angle signal including positive and negative pulses which correspond to the six trigger poles 33a–33f as shown in FIG. 12A is generated from the signal coil 13. FIG. 12A–12F show respectively the waveforms of signals produced at the points of A–F in the apparatus shown in FIG. 9. The angle signal outputted from the signal coil 13 is subjected to waveform-shaping in the waveform shaping circuit 14 (as shown in FIG. 12B) and the output of the waveform shaping circuit 14 is supplied to the microcomputer 15.

The microcomputer 15 operates as follows. At Step S21, the period $t_n$ (n = 1,2,3, ... n−5, n−4, ... n, n+1, n+2 ...) in the shaped signal is obtained. At Step S22, a value of t multiplied by $\frac{3}{8}$ is compared with a value of $t_{n-1}$ (use of the coefficient of $\frac{3}{8}$ is determined in consideration of the performance of the microcomputer 15 and accuracy of discriminating of the cylinders by the microcomputer 15, and therefore, use of the specified coefficient is not critical).

When $\frac{3}{8} t_n > t_{n-1}$, Step S23 is taken at which an angle counter is set with "1". Then, an ignition treatment of "1" is carried out for the first cylinder at Step S24. Namely, since the condition of $\frac{3}{8} t_n > t_{n-1}$ which is set at Step S22 is satisfied only by the first trigger pole 33a in view of the direction of rotation, the angle counter Ac is set with 1 (Ac=1). On the other hand, when the condition of $\frac{3}{8} t_n > t_{n-1}$ is not satisfied at Step S22, i.e. it corresponds trigger poles other than the trigger pole 33a, a value of "1" is added to the angle counter at Step S5. At Step S26, when Ac=2, an ignition treatment for the value of "2" is carried out for the first cylinder. When the Ac≠2 at Step S26, the sequential operation goes to Step S28. At Step S28, determination is made as to Ac=3. When Yes, an ignition treatment of the value "3" is carried out for the first cylinder at Step S29. On the contrary, when Ac≠3, then the sequential operation goes to Step S30. In the same manner as described above, operations of discrimination of Ac=4 at Step S30, discrimination of Ac=5 at Step S32 and discrimination of Ac=6 at Step S34 are successively carried out. In this case, when Ac=4, an ignition treatment of "1" is carried out for the second cylinder (Step S31). When Ac=5, an ignition treatment of "2" is carried out for the second cylinder (Step S33). When Ac=6, an ignition treatment of "3" is carried out for the second cylinder (Step S35) When either Ac=4 or Ac=5 is not established, the sequential operation goes to the next steps for determination.

Thus, the microcomputer 15 operates to discriminate the cylinders and to determine ignition ordering on the basis of the signal as shown in FIG. 12B and determines ignition timing by time-estimation operation by counting the distance of the trigger poles 33A–33F. The ignition timing control signal for the first cylinder (FIG. 12C) and the ignition timing control signal for the second cylinder (FIG. 12D) are respectively supplied to the ignition coils 8a, , 8b through the amplifying circuits 7a, , 7b , whereby the ignition coils 8a, , 8b are respectively actuated by the signals as shown in FIG. 12E, 12F to thereby produce a high voltage in the second coils when the current supplied thereto is interrupted. Accordingly, there produces spark discharging in the ignition plugs 9a, 9b at a predetermined ignition timing. In the description for the third embodiment, the 75°V-type two cycle engine is used for a non-distribution arrangement engine. However, the same effect can be obtained by using another type of engine other than the above-mentioned as far as a non-uniform distribution engine having plural cylinders is used. Further, in the description of the third embodiment, three trigger poles are used for one cylinder to avoid disadvantage such as reduction of power. However, a desired number of trigger poles may be used for one cylinder.

Thus, in accordance with the third embodiment of the present invention, a plurality of the trigger poles are used for each of the cylinder and signals produced by the trigger poles are compared to perform discrimination of cylinder and operation for the ignition timing. Accordingly, a plurality of cylinders are discriminated by a single signal coil, and the overall size of the control apparatus can be reduced as well as the manufacturing cost. Further, ignition timing control having a high accuracy can be attained.

Obviously, numerous modifications and variations of the present invention are possible in light of the above teachings. It is therefore to be understood that within the scope of the appended claims, the invention may be practiced otherwise than as specifically described herein.

What is claimed is:

1. An ignition timing control apparatus for an internal combustions engine which comprises:
    a signal rotor rotating in synchronism with the revolution of the engine,
    a plurality of trigger poles attached on the outer circumference of said signal rotor at positions corresponding to an ignition timing for each of the cylinders.
    a guide pole disposed in front of a specified trigger pole among said trigger poles,
    a signal coil for generating an angle signal in correspondence to the angle between said specified trigger pole and said guide pole, and
    an ignition timing operation device comprising means for measuring the periods between said guide pole and the trigger poles on the basis of said angle signal, and means for comparing one of said periods with an other by alternately multiplying said periods by a given coefficient, to thereby discriminate said cylinders and operate ignition timing for said cylinders.

2. An ignition timing control apparatus for a non-uniform arrangement type internal combustion engine wherein ignition timing angle signals for igniting a plurality of the cylinders are irregularly generated when a signal rotor is rotated in synchronism with the engine, comprising a plurality of trigger poles arranged on the outer circumference of said signal rotor at positions which are in an ignition-advance-angle-controllable range of each cylinder in said engine, a signal coil located facing said trigger poles to generate an angle signal corresponding to the angular position of said trigger poles, and an ignition timing operating means for measuring the periods between the trigger poles on the basis of said angle signal and comparing the periods by multiplying at least one of said periods by a given coefficient to thereby discriminate said cylinders and operate ignition timing for said cylinders.

3. An ignition timing control apparatus for a non-uniform arrangement type internal combustion engine wherein ignition timing angle signals for igniting a plurality of the cylinders are irregularly generated when a signal rotor is rotated in synchronism with the engine, comprising a plurality of trigger poles arranged on the outer circumference of said signal rotor so as to correspond to cylinders in said engine, a signal coil located facing said trigger poles to generate an angle signal corresponding to the angular position of said trigger poles, and an ignition timing operating device which performs operations of ignition timing on the basis of said angle signal and which comprises means for measuring each period corresponding to the angular positions of each of said trigger poles, and comparing the interval between the advance angle side and the initial side of a trigger pole with the interval between the initial side of said trigger pole and the advance angle side of the next trigger pole by multiplying at least one of said intervals by a given coefficient, to thereby discriminate said cylinders and to output an ignition timing control signal for said cylinders.

* * * * *